(12) United States Patent
Schwenke

(10) Patent No.: US 9,374,980 B1
(45) Date of Patent: Jun. 28, 2016

(54) CATTLE FEEDER

(71) Applicant: Dusty C. Schwenke, Harlem, MT (US)

(72) Inventor: Dusty C. Schwenke, Harlem, MT (US)

(73) Assignee: Little Shell Enterprises, Inc., Frenchtown, MT (US)

( * ) Notice: Subject to any disclaimer, the term of this patent is extended or adjusted under 35 U.S.C. 154(b) by 0 days.

(21) Appl. No.: 14/623,306

(22) Filed: Feb. 16, 2015

(51) Int. Cl.
*A01K 1/10* (2006.01)
*A01K 5/01* (2006.01)

(52) U.S. Cl.
CPC ... *A01K 5/01* (2013.01); *A01K 1/10* (2013.01); *A01K 1/105* (2013.01); *A01K 5/0107* (2013.01)

(58) Field of Classification Search
CPC ........... A01K 1/105; A01K 1/10; A01K 5/00; A01K 5/01; A01K 5/0107
See application file for complete search history.

(56) References Cited

U.S. PATENT DOCUMENTS

| | | | | |
|---|---|---|---|---|
| 40,101 | A * | 9/1863 | Heaton | A01K 5/01 119/58 |
| 43,609 | A * | 7/1864 | Sias et al. | A01K 5/01 119/58 |
| 2,491,577 | A * | 12/1949 | Olinger | A01K 1/10 119/513 |
| 2,729,196 | A * | 1/1956 | Breitenbach | A01K 1/0613 119/512 |
| 2,815,001 | A * | 12/1957 | Hanson | A01K 1/10 119/510 |
| 2,936,735 | A * | 5/1960 | Smith | A01K 5/0107 119/52.1 |
| 3,063,416 | A * | 11/1962 | Elstner | A01K 1/10 119/449 |
| 3,336,908 | A * | 8/1967 | Swanson | A01F 25/04 119/512 |
| 3,620,192 | A * | 11/1971 | Taylor | A01K 1/105 119/449 |
| 3,834,353 | A * | 9/1974 | Groezinger | A01K 1/10 119/60 |
| 3,906,902 | A * | 9/1975 | Rose | A01K 1/10 119/60 |
| 3,913,529 | A * | 10/1975 | Leigh, Jr. | A01K 1/10 119/60 |
| 3,972,307 | A * | 8/1976 | Marseillan | A01K 3/00 119/502 |
| 4,148,278 | A * | 4/1979 | Anderson | A01K 1/105 119/60 |
| 4,371,148 | A * | 2/1983 | Harden | A01K 1/10 160/135 |
| 4,419,963 | A * | 12/1983 | Willibrordus | A01K 1/105 119/51.01 |
| 4,574,740 | A * | 3/1986 | Koebel | A01K 1/10 119/60 |
| 4,722,302 | A * | 2/1988 | Gee, Jr. | A01K 5/0107 119/60 |
| 5,054,430 | A * | 10/1991 | Weelink | A01K 5/00 119/51.01 |
| 5,067,442 | A * | 11/1991 | Schilling | A01K 5/01 119/60 |
| 5,092,273 | A * | 3/1992 | Meyer | A01K 5/0107 119/52.4 |
| 5,158,040 | A | 10/1992 | Martin | |
| 5,311,840 | A * | 5/1994 | Rumbaugh | A01K 5/01 119/60 |
| 5,355,834 | A * | 10/1994 | Blazek | A01K 1/10 119/51.11 |
| 5,361,724 | A * | 11/1994 | Kuhns | A01K 5/0107 119/60 |
| 5,386,800 | A | 2/1995 | Pirok | |
| 5,433,172 | A * | 7/1995 | Weelink | A01K 1/105 119/57.92 |
| 5,586,519 | A | 12/1996 | Wilkinson | |
| 5,947,055 | A * | 9/1999 | Cross | A01K 1/10 119/58 |
| 6,006,696 | A * | 12/1999 | Mann | A01K 1/10 119/60 |
| 6,039,002 | A * | 3/2000 | Strankman | A01K 1/105 119/57.1 |
| 8,555,815 | B2 | 10/2013 | Hofer | |
| 2003/0029386 | A1 * | 2/2003 | Sprik | A01K 1/105 119/60 |
| 2006/0070580 | A1 * | 4/2006 | Klene | A01K 5/01 119/60 |
| 2012/0000429 | A1 * | 1/2012 | Hofer | A01K 5/01 119/60 |
| 2014/0020632 | A1 * | 1/2014 | Koch | A01K 1/10 119/60 |
| 2015/0322716 | A1 * | 11/2015 | Wollesen | A01K 1/10 119/63 |

* cited by examiner

*Primary Examiner* — Monica Williams
*Assistant Examiner* — Michael A Fabula
(74) *Attorney, Agent, or Firm* — Antoinette M. Tease

(57) ABSTRACT

A cattle feeder comprising two end walls and two side walls that are configured to slide laterally inward and outward in relation to the two end walls. The two side walls comprise a plurality of support members that create a distance between the side walls and feed within the feeder. Two horizontal push bars are connected to the support members on the inside of the feeder and are configured to push feed inward as the two side walls slide inward.

6 Claims, 10 Drawing Sheets

CATTLE FEEDER

BACKGROUND OF THE INVENTION

1. Field of the Invention

The present invention relates to the field of cattle feeders, and more particularly, to a telescoping cattle feeder with a set of internal push bars that prevents waste by keeping the feed within the confines of the feeder.

2. Description of the Related Art

There are a number of livestock feeders in which the feed (typically a large, round hay bale) is confined within a four-sided structure and the longitudinal sides are comprised of vertically oriented bars that are spaced widely enough so as to allow the livestock to feed off of the hay within the feeder. Some of these feeders even comprise sides that telescope inward so as to allow the livestock to continue to access the hay bale as its volume diminishes.

None of these feeders, however, comprises a set of internal push bars that are preferably removable for transport. The internal push bars serve to increase the distance between the feed and the livestock (but not so far as to prevent the livestock from accessing the feed) so as to ensure that any hay that is dislodged from the bale by the livestock falls to the ground inside (and not outside) of the feeder. If the hay falls to the ground within the feeder (that is, just inside of the two longitudinal walls), then the livestock will continue to feed on it. If the hay falls to the ground outside of the feeder, then it will be trampled and is not likely to be consumed by the livestock. By providing a set of internal push bars, the present invention minimizes waste and maximizes the amount of feed that is actually consumed by the livestock.

U.S. Pat. No. 3,834,353 (Groezinger, 1974) discloses a haystack feeder in which six panels are hinged together at adjacent ends to form the feeder. The hinging is configured so as to allow the feeder to collapse inwardly into two triangular configurations as the cattle eat away the haystack.

U.S. Pat. No. 5,158,040 (Martin, 1992) discloses an animal feeder comprised of an outer cage of bars through which cows pass their heads and necks and an inner cage, which holds a cylindrical hay bale. The device includes a trough extending between the two cages so that any hay that falls from the cow's mouth while feeding is caught in the trough. None of the walls of this feeder is collapsible.

U.S. Pat. No. 5,386,800 (Pirok, 1995) discloses a manger for large, round hay bales. The manger comprises a square box at the bottom to keep dry any hay that falls from the bale. Vertical posts at each corner of the box are connected by horizontal cross braces. Slanted bars are attached to the upper horizontal bars and slant toward the center of the lower box. The slanted bars support the hay and prevent the cattle from entering the box.

U.S. Pat. No. 5,586,519 (Wilkinson, 1996) discloses a bale feeder in which two side frames are connected to a bottom frame. The side frames are connected by a front side rail and a rearward side rail. Chains are used within the frames to hold the hay inside the feeder while allowing the livestock to reach the hay.

U.S. Pat. No. 8,555,815 (Hofer, 2013) discloses a livestock feeder containing one or more large hay bales. The feeder is comprised of a base, a bunk wall extending upwardly from the base to surround a lower bunk area, and a hopper wall spaced above the bunk wall. The hopper wall surrounds an upper hopper area that allows a large bale to fall through to the lower bunk area.

BRIEF SUMMARY OF THE INVENTION

The present invention is a cattle feeder comprising: two end walls, each of the two end walls comprising first and second laterally oriented flat panels, a first slot between the first and second laterally oriented flat panels, and a top rail that is situated above a top edge of the second laterally oriented flat panel and defines a second lateral slot between the top rail and the top edge of the second laterally oriented flat panel; two side walls, each of the two side walls comprising a longitudinally oriented flat panel with a top edge that is attached to a first longitudinal bar, the first longitudinal bar having a first end and a second end and terminating in a first receiver on the first and second ends of the first longitudinal bar, each of the two side walls further comprising a second longitudinal bar having a first end and a second end and terminating in a second receiver on the first and second ends of the second longitudinal bar, the second longitudinal bar being parallel to and spaced vertically from the first longitudinal bar; wherein the first and second ends of the first longitudinal bar extend through the first lateral slot, and the first and second ends of the second longitudinal bar extend through the second lateral slot; wherein a connection member is inserted vertically into the first and second receivers and is situated outside of the second laterally oriented flat panel of the end wall; and wherein the side walls slide laterally slide inward as pressure is placed against them by cattle eating at the feeder, and as the side walls slide inward, the first longitudinal bar slides within the first lateral slot, and the second longitudinal bar slides within the second lateral slot; a plurality of support members situated on each side wall between the first and second longitudinal bars and extending inward toward a center of the feeder, a first end of each support member being affixed to the first longitudinal bar and a second end of each support member being affixed to the second longitudinal bar; and first and second horizontal push bars, each of the first and second horizontal push bars being connected to the plurality of support members such that the horizontal push bars compact feed within the feeder as the side walls slide inward.

In a preferred embodiment, the first and second laterally oriented flat panels and the top rail of the end walls are connected to vertical posts that define four corners of the feeder. Preferably, each of the two side walls further comprising a third longitudinal bar that is attached to a bottom edge of the longitudinally oriented flat panel, the second and third longitudinal bars being connected by secondary vertical support members located on an interior side of the longitudinally oriented flat panel; each of the two side walls having a first end and a second end, the invention further comprising primary vertical support members that are located on the first and second ends of the side walls, the primary vertical support members connecting the third longitudinal bar, the longitudinally oriented flat panel, the first longitudinal bar, and the second longitudinal bar.

Optionally, each of the support members has a center, and the invention further comprising a plurality of brackets situated at roughly the center of each of the plurality of support members and a removable chain that extends through the brackets. Optionally, each of the support members has a center, and the invention further comprising a plurality of brackets situated at roughly the center of each of the plurality of support members and a chain with a first end that is removably secured to the primary vertical support member on the first end of the side wall and a second end that is removably secured to the primary vertical support member on the second end of the side wall.

In an alternate embodiment, the horizontal push bars are configured to be removable for transport. In a preferred embodiment, the present invention is a cattle feeder comprising two end walls, two side walls that are configured to slide laterally inward and outward in relation to the two end walls, the two side walls comprising a plurality of support members that create a distance between the side walls and feed within the feeder, and two horizontal push bars that are connected to the support members on an inside of the feeder and that are configured to push feed inward as the two side walls slide inward.

REFERENCE NUMBERS

Figure 1:
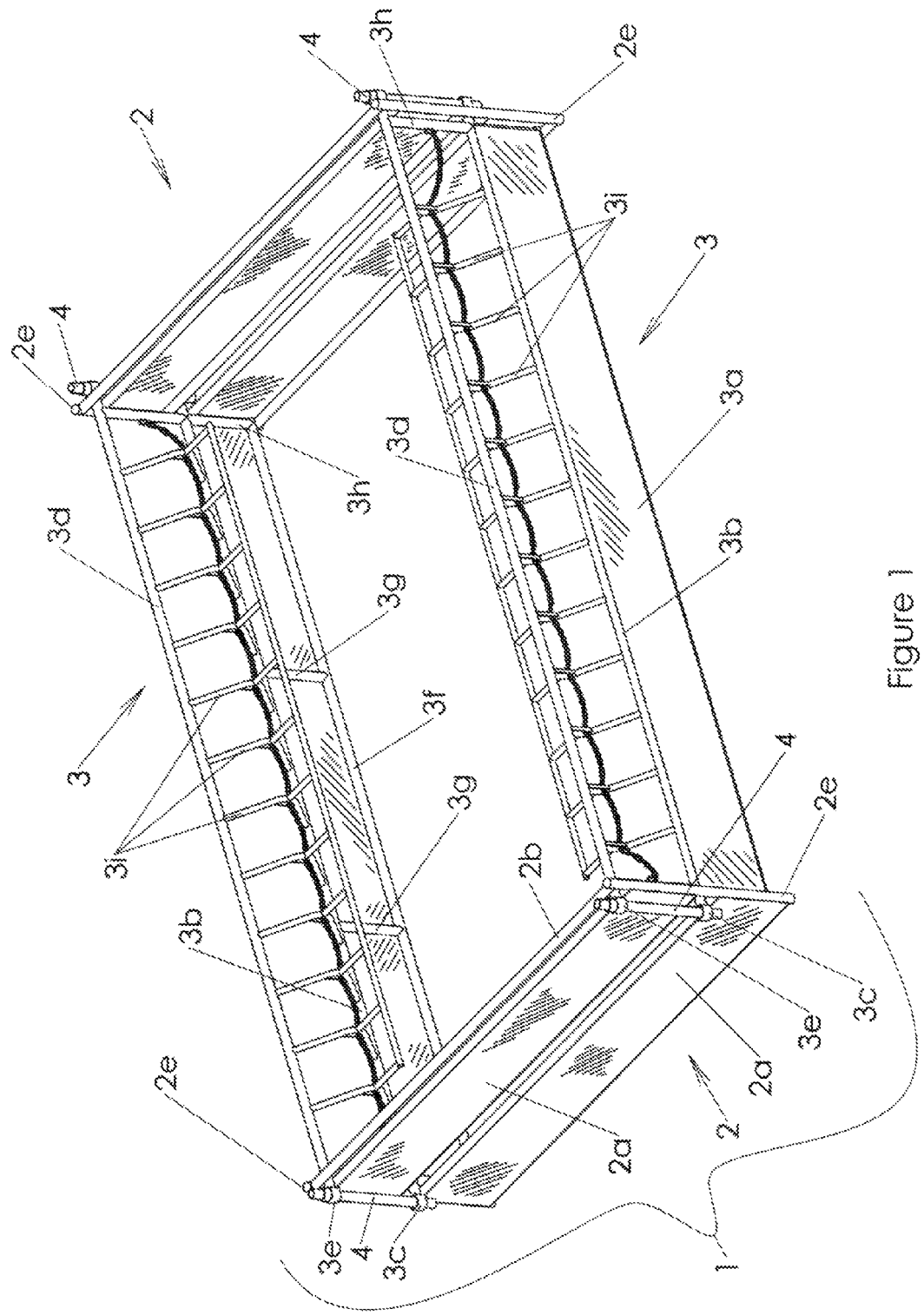
FIG. 1 is a perspective view of the present invention with the two longitudinal sides in a fully extended position.

1 Cattle feeder
2 Lateral side/side wall
2a Laterally oriented flat panel
2b Top rail
2c First lateral slot
2d Second lateral slot
2e Vertical post
3 Longitudinal side/side wall
3a Longitudinally oriented flat panel
3b First longitudinal bar
3c First receiver
3d Second longitudinal bar
3e Second receiver
3f Third longitudinal bar
3g Secondary vertical support member
3h Primary vertical support member
3i Curved support member
3j Vertical bracket
3k Horizontal extension
3l Horizontal push bar
3m Insertion bar
3n Pin
4 Connection member
4a Stop
5 Chain

DETAILED DESCRIPTION OF INVENTION

FIG. 1 is a perspective view of the present invention with the two longitudinal sides in a fully extended position. The present invention is a cattle feeder 1 comprised of two lateral sides (or side walls) 2 and two longitudinal sides (or side walls) 3. Each of the two longitudinal side walls 3 is configured to slide laterally inward and outward in relation to the lateral end walls 2. Each lateral end wall 2 preferably comprises two laterally oriented flat panels 2a and a top rail 2b. The two laterally oriented flat panels 2a are spaced so as to create a first lateral slot 2c between them (see FIG. 3). The top rail 2b is situated above the top edge of the upper-most flat panel 2a and defines a second lateral slot 2d between the top rail 2b and the top edge of the upper-most flat panel 2a (see FIG. 3). The flat panels 2a and top rail 2b are connected to vertical posts 2e, which define the corners of the feeder.

Each longitudinal side wall 3 comprises a longitudinally oriented flat panel 3a, the top edge of which is attached (welded) to a first longitudinal bar 3b. The first longitudinal bar 3b terminates in a first receiver (or sleeve) 3c on either end of the first longitudinal bar 3b (see FIG. 3). The longitudinal side wall 3 further comprises a second longitudinal bar 3d, which also terminates in a second receiver (or sleeve) 3e on either end of the second longitudinal bar 3d (see FIG. 3). The second longitudinal bar 3d is parallel to and spaced vertically from the first longitudinal bar 3b. A third longitudinal bar 3f is preferably situated at and attached to (welded) the bottom edge of the flat panel 3a. The second 3d and third 3f longitudinal bars are connected by secondary vertical support members 3g located on the interior side of the flat panel 3a. Primary vertical support members 3h are located on either end of the longitudinal side wall 3 and connect the third longitudinal bar 3f, the flat panel 3a, the first longitudinal bar 3b, and the second longitudinal bar 3d. Note that the receivers 3c, 3e extend further longitudinally than the primary vertical support members 3h.

A plurality of curved support members 3i is situated on each longitudinal side wall 3 between the first longitudinal bar 3b and second longitudinal bar 3d. The curved support members 3i extend (or curve) inward toward the center of the feeder. One end of each curved support member 3i is attached (welded) to the first longitudinal bar 3b, and the other end of each curved support member 3i is attached (welded) to the second longitudinal bar 3d. The plurality of curved support members 3i preferably does not extend the entire length of the longitudinal side wall 3 but begins and ends a certain distance from each end of the longitudinal side wall 3 so that there is a space between the outer-most curved support member 3i and the primary vertical support member 3h on either end of the longitudinal side wall 3.

Each of the two ends of the first longitudinal bar 3b extends through the first lateral slot 2c, and each of the two ends of the second longitudinal bar 3d extends through the second lateral slot 2d. A connection member 4 is inserted vertically into the first and second receivers 3c, 3e such that the connection member 4 is situated on the outside of the upper-most flat panel 2a of the lateral end wall 2. The longitudinal side walls 3 slide laterally inward as pressure is placed against any part of the longitudinal side wall 3 by livestock eating at the feeder. As the longitudinal side walls 3 slide inward, the first longitudinal bar 3b slides within the first lateral slot 2c, and the second longitudinal bar 3d slides within the second lateral slot 2d (see FIG. 4).

Figure 2:
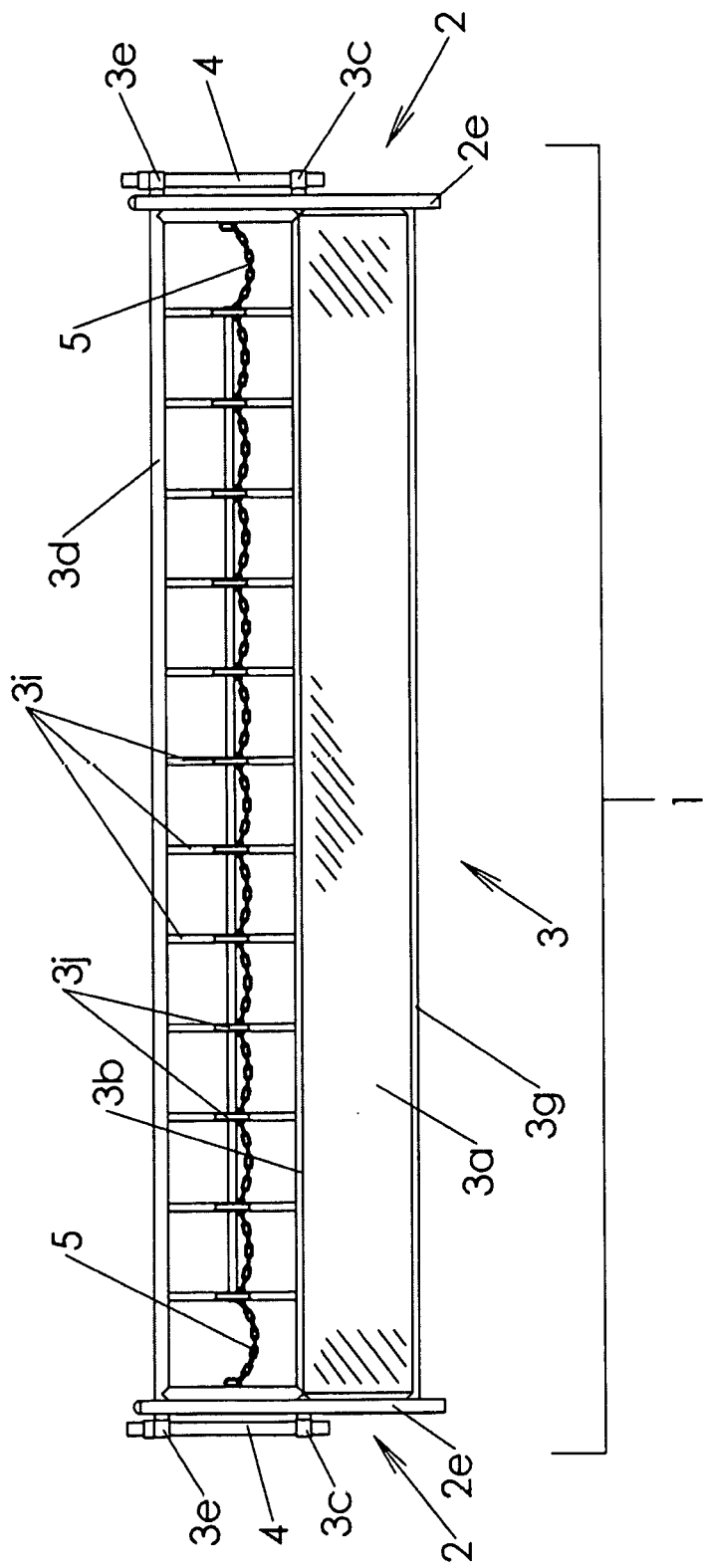
FIG. 2 is a longitudinal side view of the present invention.

FIG. 2 is a longitudinal side view of the present invention. In a preferred embodiment, vertical brackets 3j are preferably welded to the center of each of the curved support member 3i so that a chain 5 may be run through the brackets 3j and removably secured to the primary vertical support member 3h at either end of the chain 5. The purpose of the chain is two-fold; it allows calves to feed at the feeder without falling into the feeder, and it also enables the calves to slide the longitudinal side walls 3 inward by exerting pressure on the chain 5. The chain 5 can be removed when larger animals are feeding at the feeder.

Figure 3:
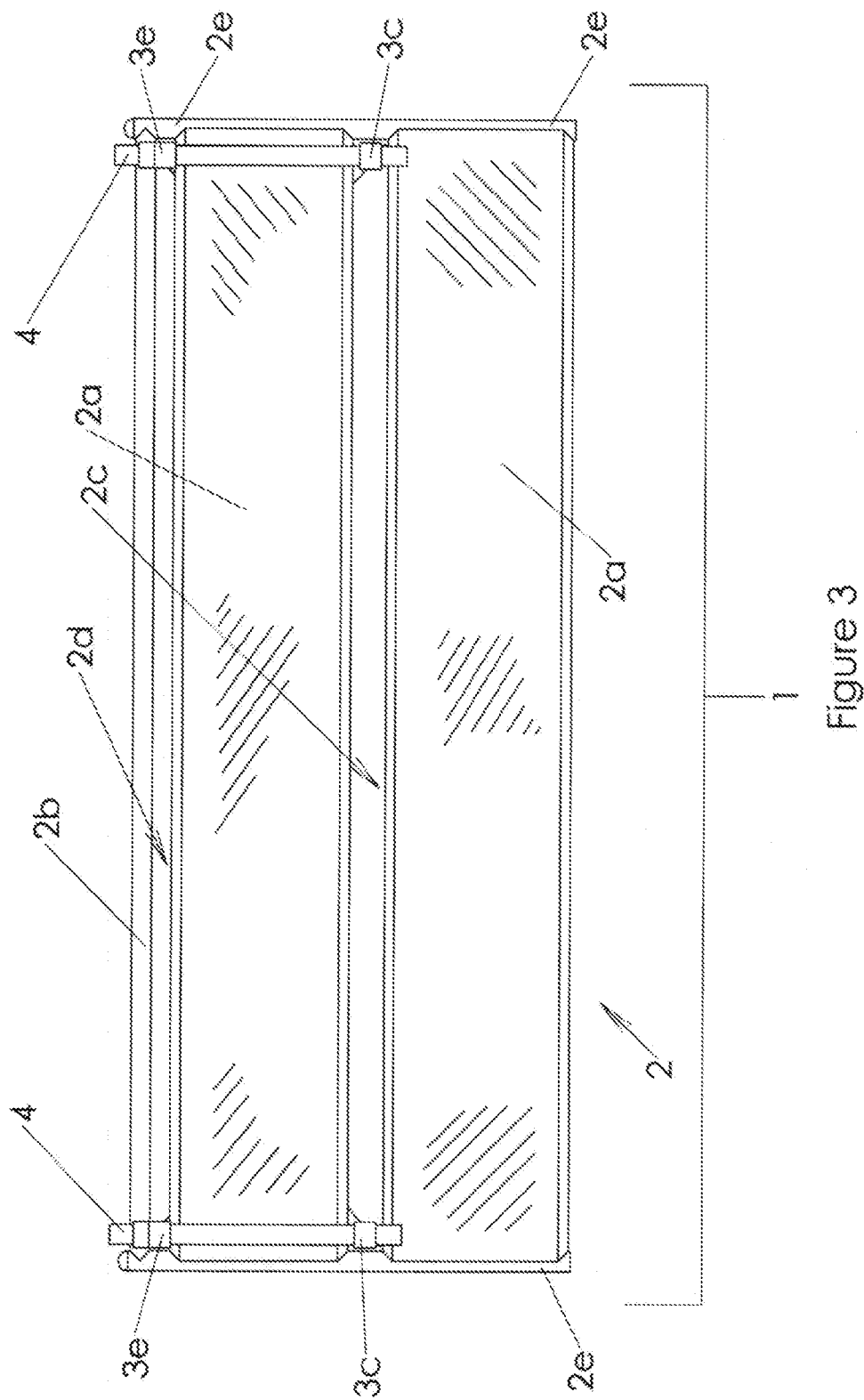
FIG. 3 is a lateral side view of the present invention shown with the two longitudinal sides in a fully extended position.

FIG. 3 is a lateral side view of the present invention shown with the two longitudinal sides in a fully extended position. The components shown in this figure have been previously described.

Figure 4:
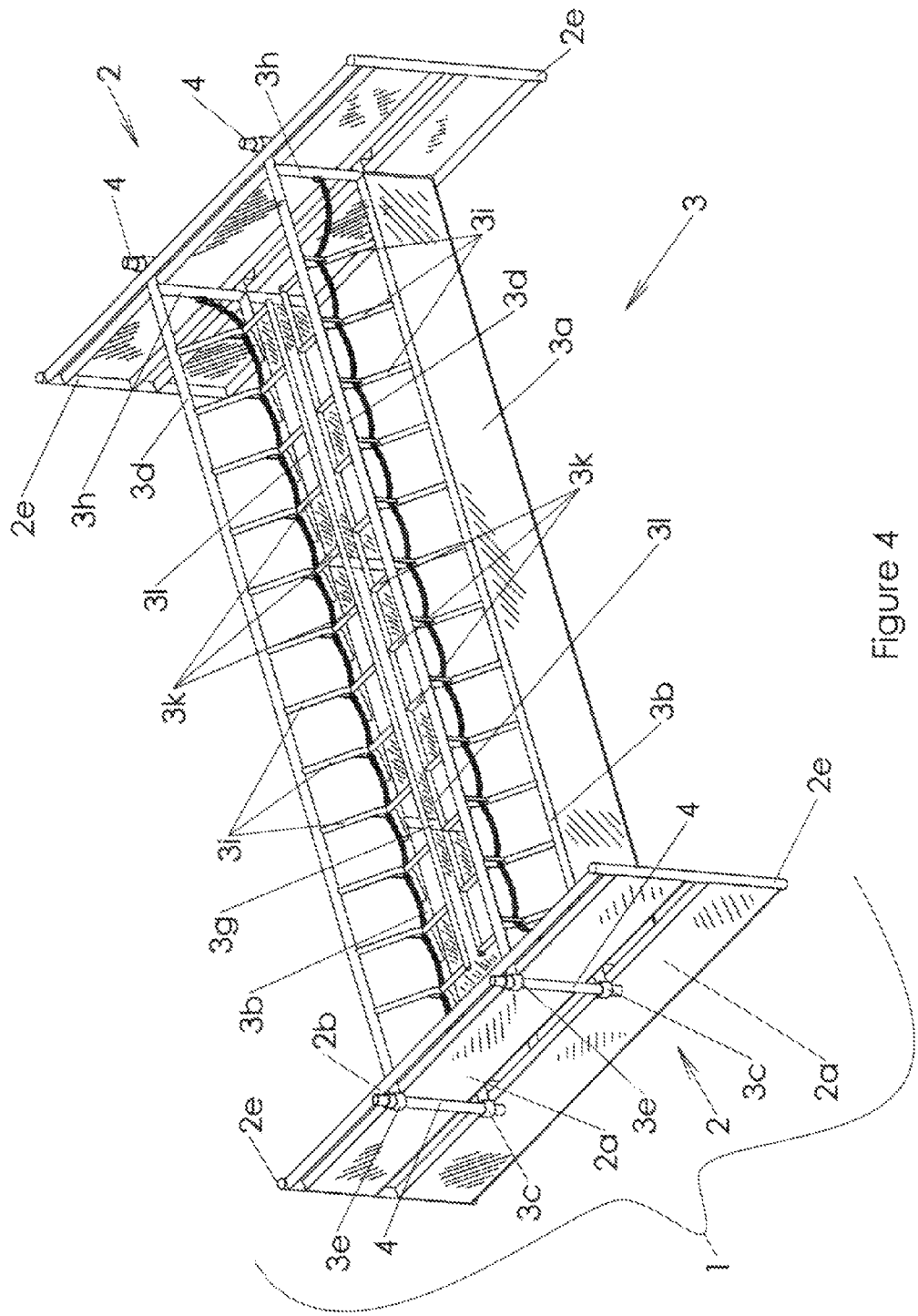
FIG. 4 is a perspective view of the present invention with the two longitudinal sides in a collapsed position.

FIG. 4 is a perspective view of the present invention with the two longitudinal sides in a collapsed position. In a preferred embodiment, a plurality of horizontal extensions 3k extends horizontally inward from the center point of each of the curved support members 3i. The terminal (inward-most) end of each of the horizontal extensions 3k is connected (welded) to a horizontal push bar 3l. The purpose of the horizontal push bar 3l is to push or compact the feed (hay bale) as the cattle eat it. As the two longitudinal side walls 3 are pushed inward by the cattle, the hay is compacted by the push bars 3l. The curved support members 3i and horizontal extensions 3k together create a distance between the hay bale and the cattle (see FIG. 7). Because of this distance created by the curved support members 3i and horizontal extensions 3k, any hay that is dislodged from the bale by the cattle will fall inside of the feeder (and be eaten by the cattle) rather than falling outside of the feeder. Note that the horizontal push bars 3l are configured so as to push against the widest part of the hay bale (see FIG. 7).

Figure 5:
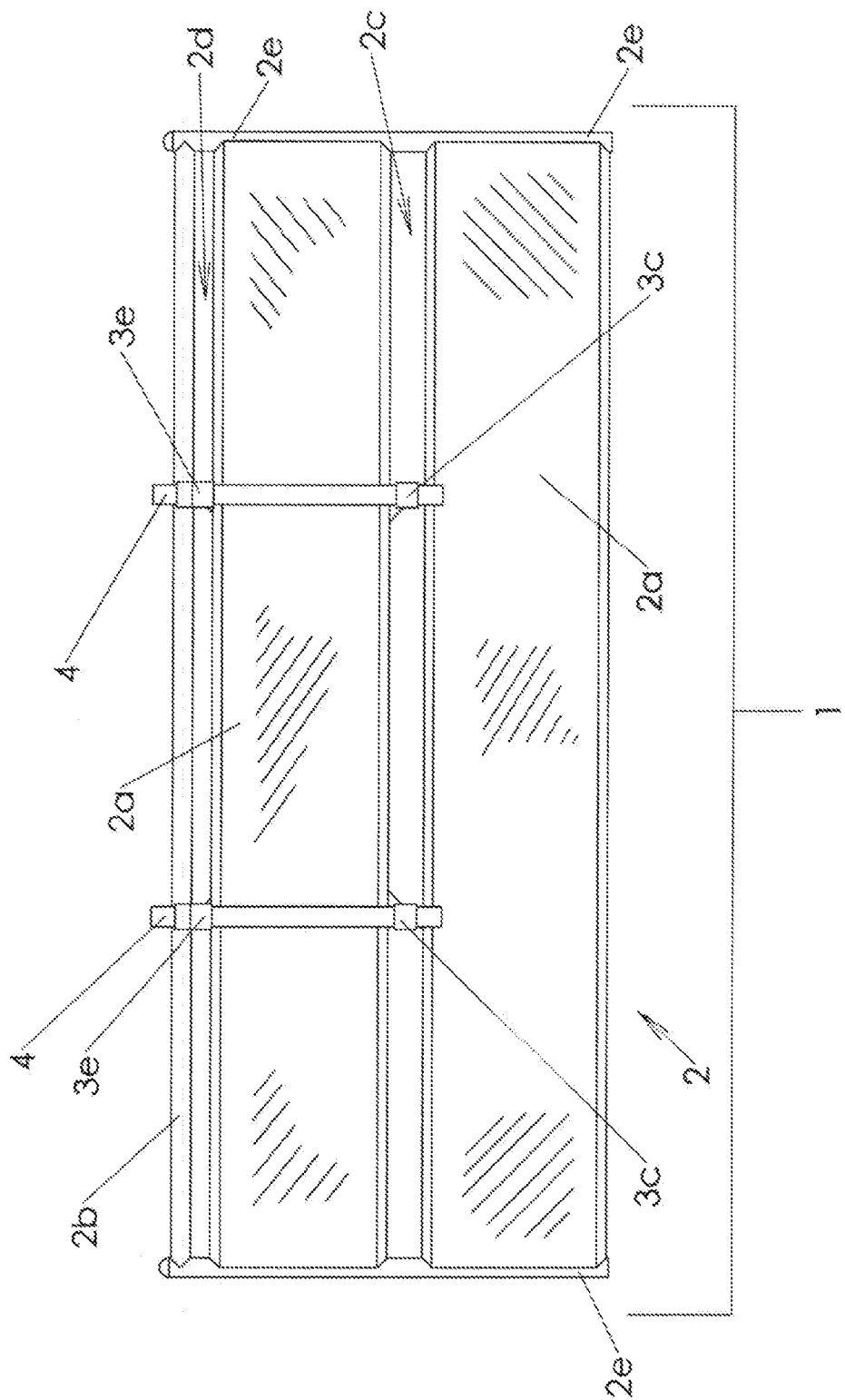
FIG. 5 is a lateral side view of the present invention shown with the two longitudinal sides in a collapsed position.

FIG. 5 is a lateral side view of the present invention shown with the two longitudinal sides in a collapsed position. The components shown in this figure have been previously described.

Figure 6:
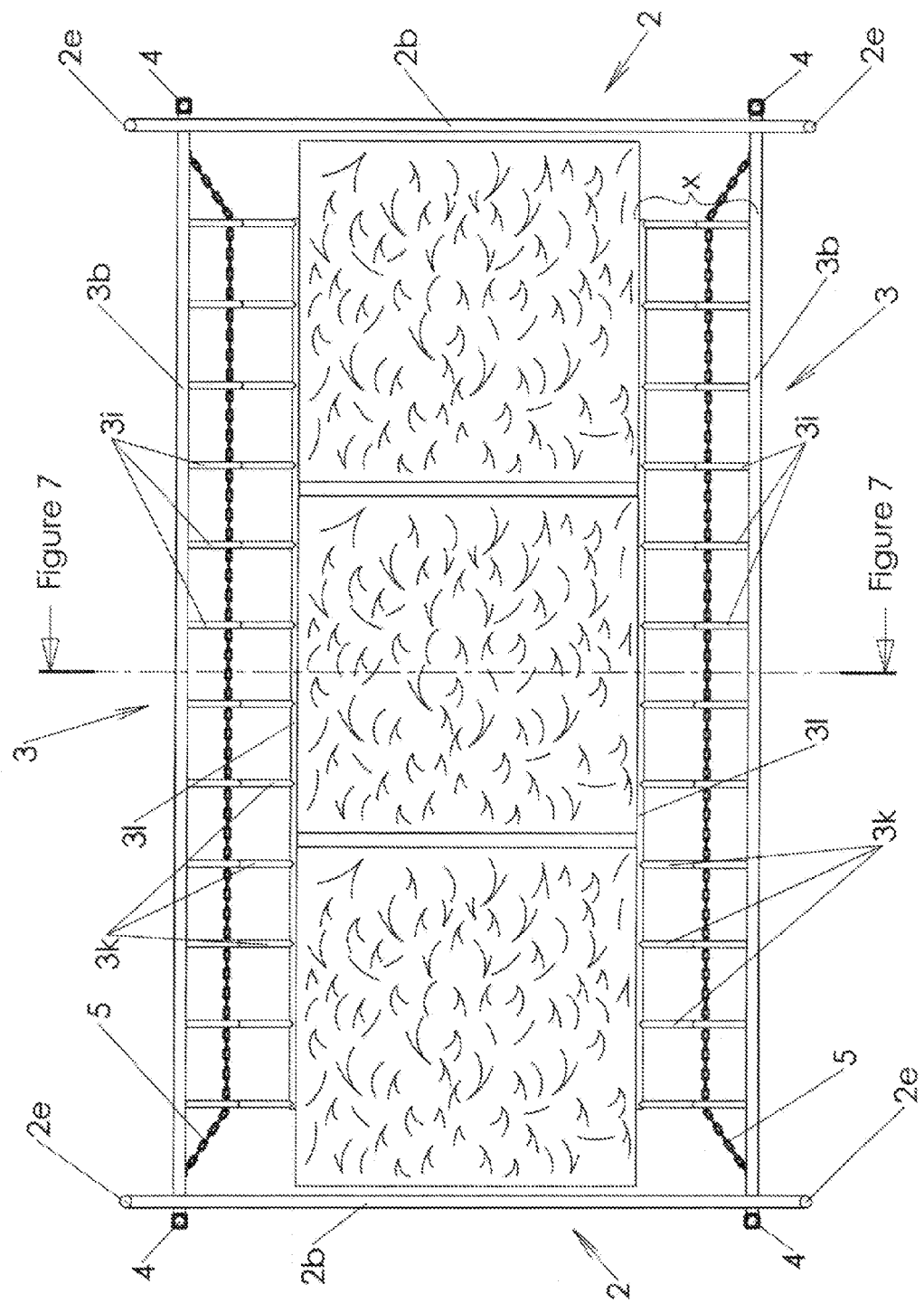
FIG. 6 is a top view of the present invention shown with the two longitudinal sides in a fully extended position.

FIG. 6 is a top view of the present invention shown with the two longitudinal sides in a fully extended position. The primary purpose of this figure is to show where the section view of FIG. 7 is taken.

Figure 7:
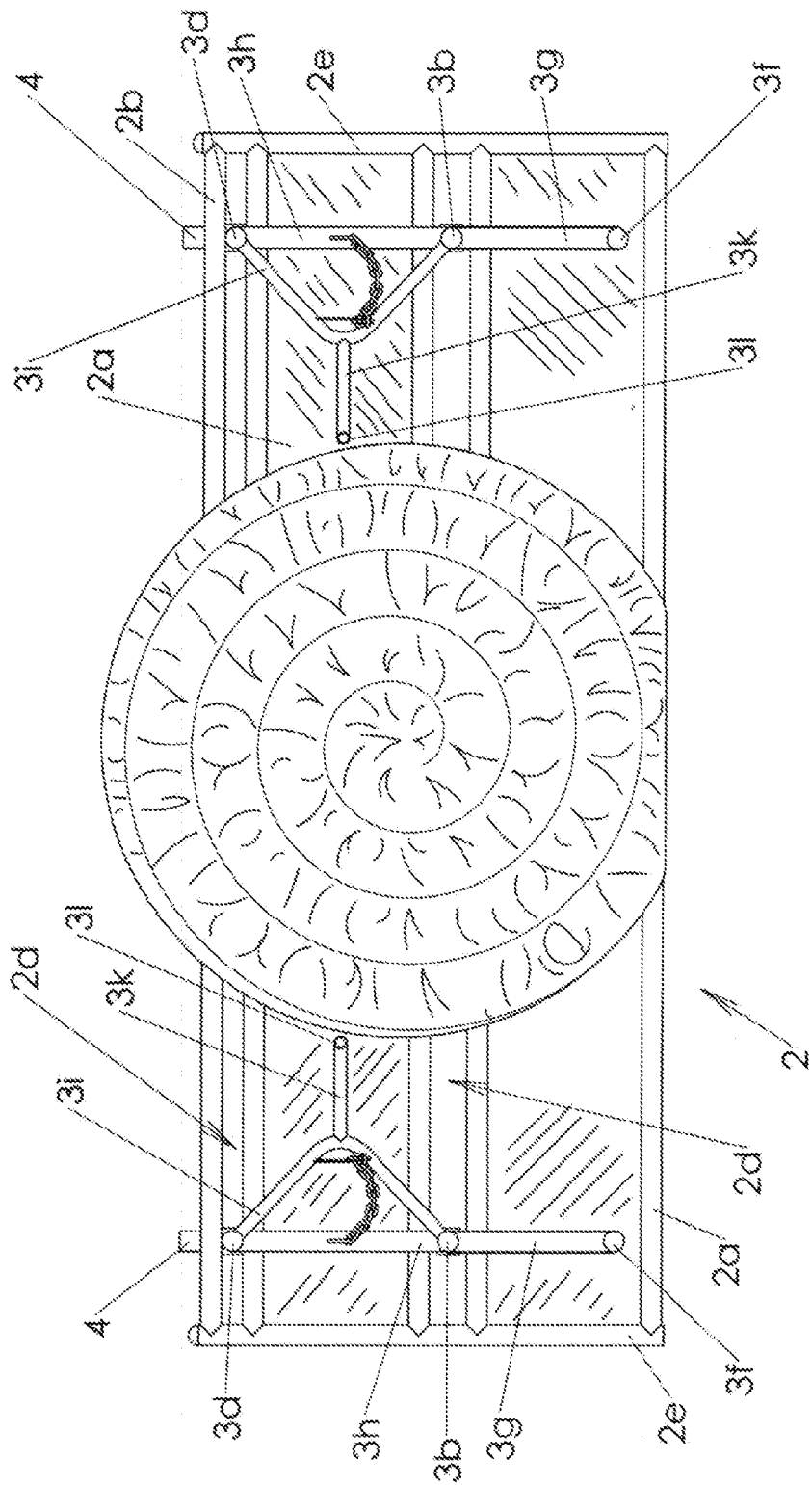
FIG. 7 is a section view taken at the line shown in FIG. 6 and shown with feed (hay) inside of the feeder.

FIG. 7 is a section view taken at the line shown in FIG. 6 and shown with feed (hay) inside of the feeder. As described previously, the horizontal push bars 3l serve to compact the feed as the cattle push the longitudinal side walls 3 inward. This and the previous figure clearly show the distance (designated with an "X" in FIG. 6) between the hay bale and the first longitudinal bar 3b/second longitudinal bar 3d/longitudinally oriented panel 3a (all of which define the outer surface of the longitudinal side wall 3) created by the curved support members 3i and horizontal extensions 3k. Note that although the horizontal push bars 3l are shown as being connected to the plurality of curved support members 3i via horizontal extensions 3k, the horizontal push bars 3l may be connected to the curved support members 3i by other means. Note also that although the support members 3i are shown as being curved inward, the present invention is not limited to any particular shape of support members 3i, as long as the support members are situated between the first and second longitudinal bars 3b, 3d and as long as they extend inward.

Figure 8:
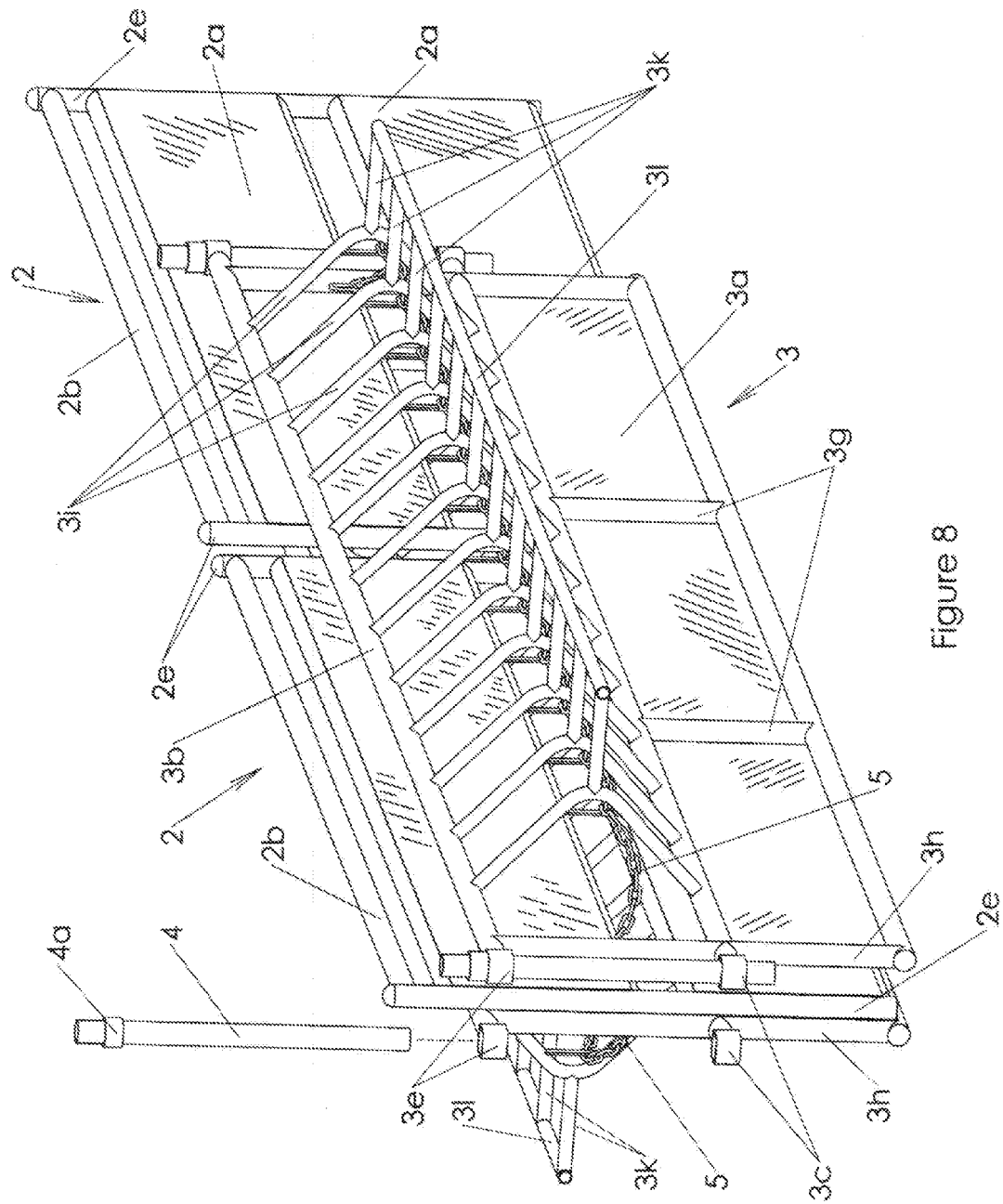
FIG. 8 is a perspective view of the present invention shown with all four sides disconnected from one another and in a transport position.

FIG. 8 is a perspective view of the present invention shown with all four sides disconnected from one another and in a transport position. As shown in this figure, the connection member 4 is fitted with a stop 4a to prevent the connection member 4 from falling through the first and second receivers 3c, 3e. To disassemble the feeder, the connection members 4 are removed from the receivers 3c, 3e, and then the lateral 2 and longitudinal 3 side walls can be stacked for transport. Significantly, no tools are required to assemble, disassemble, or operate the feeder.

Figure 9:
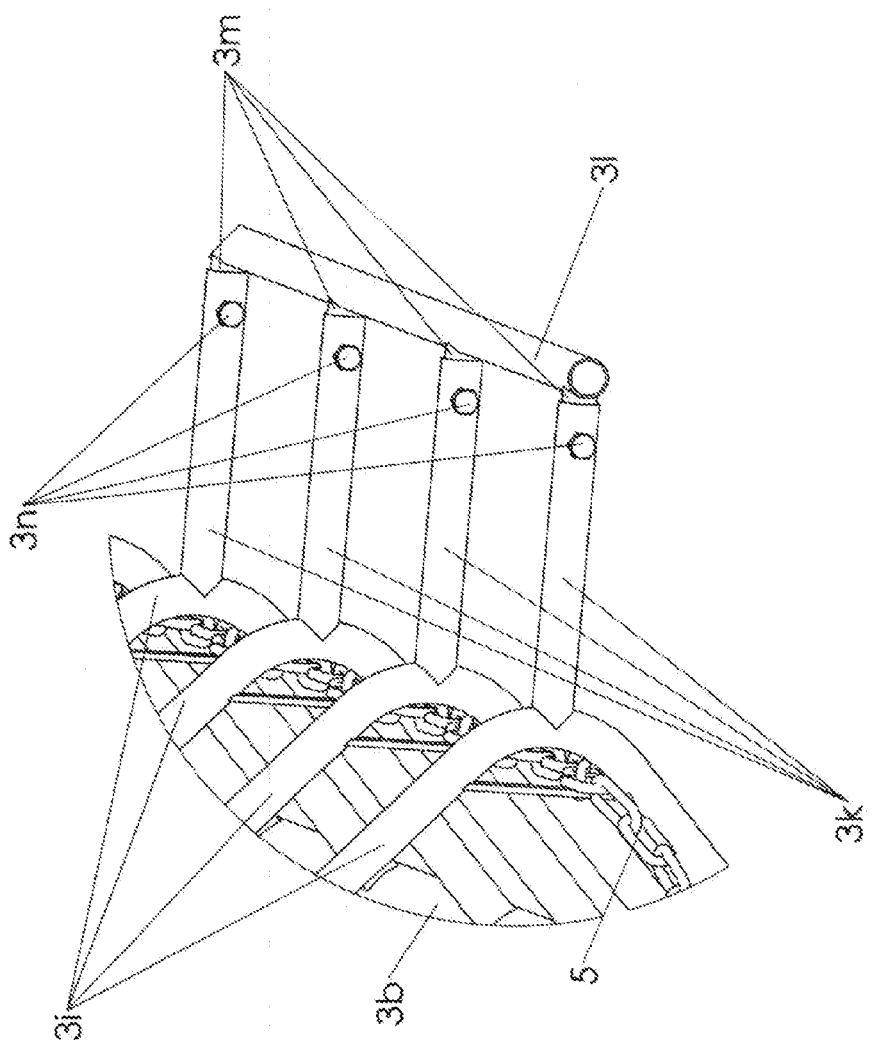
FIG. 9 is a detail view of an alternate embodiment of the internal push bar in which the internal push bar is removable.
Figure 10:
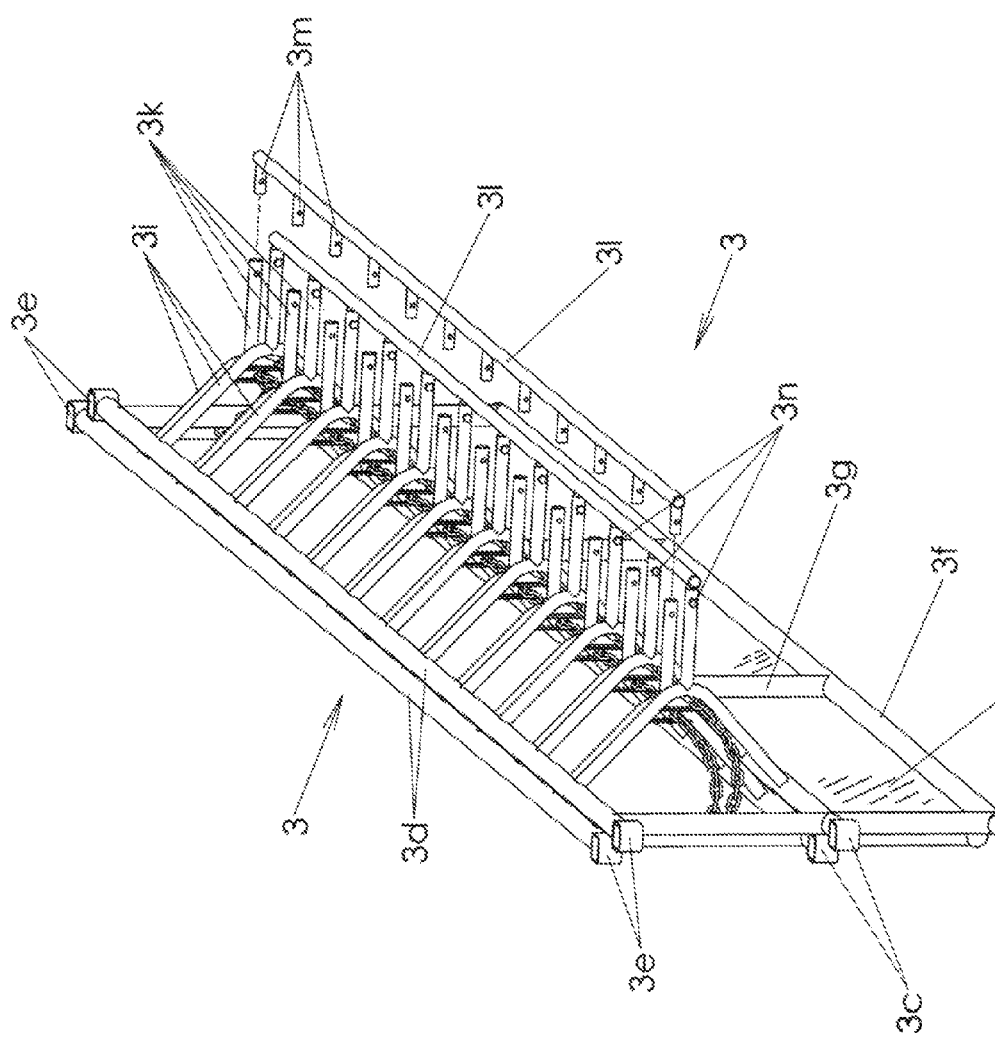
FIG. 10 is a perspective view of the invention with the alternate embodiment of the internal push bar showing the two longitudinal side walls stacked for transport.

FIG. 9 is a detail view of an alternate embodiment of the internal push bar in which the internal push bar is removable. In this embodiment, the horizontal push bar 3d is removable for transport. The horizontal push bar 3d comprises a plurality of insertion bars 3m, which are inserted into the horizontal extensions 3k and secured with a pin 3n. The advantage of this embodiment is that the longitudinal side walls 3 can be stacked for transport, as shown in FIG. 10. FIGS. 9 and 10 illustrate one manner in which the horizontal push bar 3d may be configured so that it is removable from the horizontal extensions 3k, but the present invention is not limited to this particular method of detaching the horizontal push bar 3d from the horizontal extensions 3k. There are other methods by which the horizontal push bar 3d may be configured to be removable from the horizontal extensions 3k, for example, by welding a ring (not shown) on the end of each of the horizontal extensions 3k and sliding the horizontal push bar 3d through the rings.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A cattle feeder comprising:
   (a) two end walls, each of the two end walls comprising first and second laterally oriented flat panels, a first slot between the first and second laterally oriented flat panels, and a top rail that is situated above a top edge of the second laterally oriented flat panel and defines a second lateral slot between the top rail and the top edge of the second laterally oriented flat panel;
   (b) two side walls, each of the two side walls comprising a longitudinally oriented flat panel with a top edge that is attached to a first longitudinal bar, the first longitudinal bar having a first end and a second end and terminating in a first receiver on the first and second ends of the first longitudinal bar, each of the two side walls further comprising a second longitudinal bar having a first end and a second end and terminating in a second receiver on the first and second ends of the second longitudinal bar, the second longitudinal bar being parallel to and spaced vertically from the first longitudinal bar;
   wherein the first and second ends of the first longitudinal bar of each side wall extend through the first lateral slot of each end wall, and the first and second ends of the second longitudinal bar of each side wall extend through the second lateral slot of each end wall;
   wherein a connection member is inserted vertically into each of the first and second receivers and is situated outside of the second laterally oriented flat panel of each end wall; and
   wherein the side walls slide laterally and inwardly as pressure is placed against them by cattle eating at the feeder, and as the side walls slide inward, the first longitudinal bar of each side wall slides within the first lateral slot of each end wall, and the second longitudinal bar of each side wall slides within the second lateral slot of each end wall;
   (c) a plurality of support members situated on each side wall between the first and second longitudinal bars and extending inward toward a center of the feeder, a first end of each support member being affixed to the first longitudinal bar of the respective side wall and a second end of each support member being affixed to the second longitudinal bar of the respective side wall; and
   (d) first and second horizontal push bars, each of the first and second horizontal push bars being connected to the plurality of support members on a respective side wall such that the horizontal push bars compact feed placed within the confines of the feeder as the side walls slide inward.

2. The cattle feeder of claim 1, wherein the first and second laterally oriented flat panels and the top rail of the end walls are connected to vertical posts that define four corners of the feeder.

3. The cattle feeder of claim 1, each of the two side walls further comprising a third longitudinal bar that is attached to a bottom edge of the longitudinally oriented flat panel, the second and third longitudinal bars being connected by secondary vertical support members located on an interior side of the longitudinally oriented flat panel; and each of the two side walls having a first end and a second end, the cattle feeder further comprising primary vertical support members that are located on the first and second ends of the side walls, the primary vertical support members connecting the third longitudinal bar, the longitudinally oriented flat panel, the first longitudinal bar, and the second longitudinal bar.

4. The cattle feeder of claim 1, wherein each of the support members has a center, the cattle feeder further comprising a bracket situated at roughly the center of each of the plurality of support members and a removable chain that extends through the brackets.

5. The cattle feeder of claim 3, wherein each of the support members has a center, the cattle feeder further comprising a bracket situated at roughly the center of each of the plurality of support members and a chain for each side wall with a first end that is removably secured to the primary vertical support member on the first end of each of the side walls and a second end that is removably secured to the primary vertical support member on the second end of each of the side walls.

6. The cattle feeder of claim 1, in which the horizontal push bars are configured to be removable for transport.

\* \* \* \* \*